Dec. 28, 1926.

J. KOBASICH 1,612,130

TIRE RIM EXPANDING AND CONTRACTING TOOL

Filed April 10, 1926    2 Sheets-Sheet 1

Inventor
J. Kobasich,

By Clarence A. O'Brien
Attorney

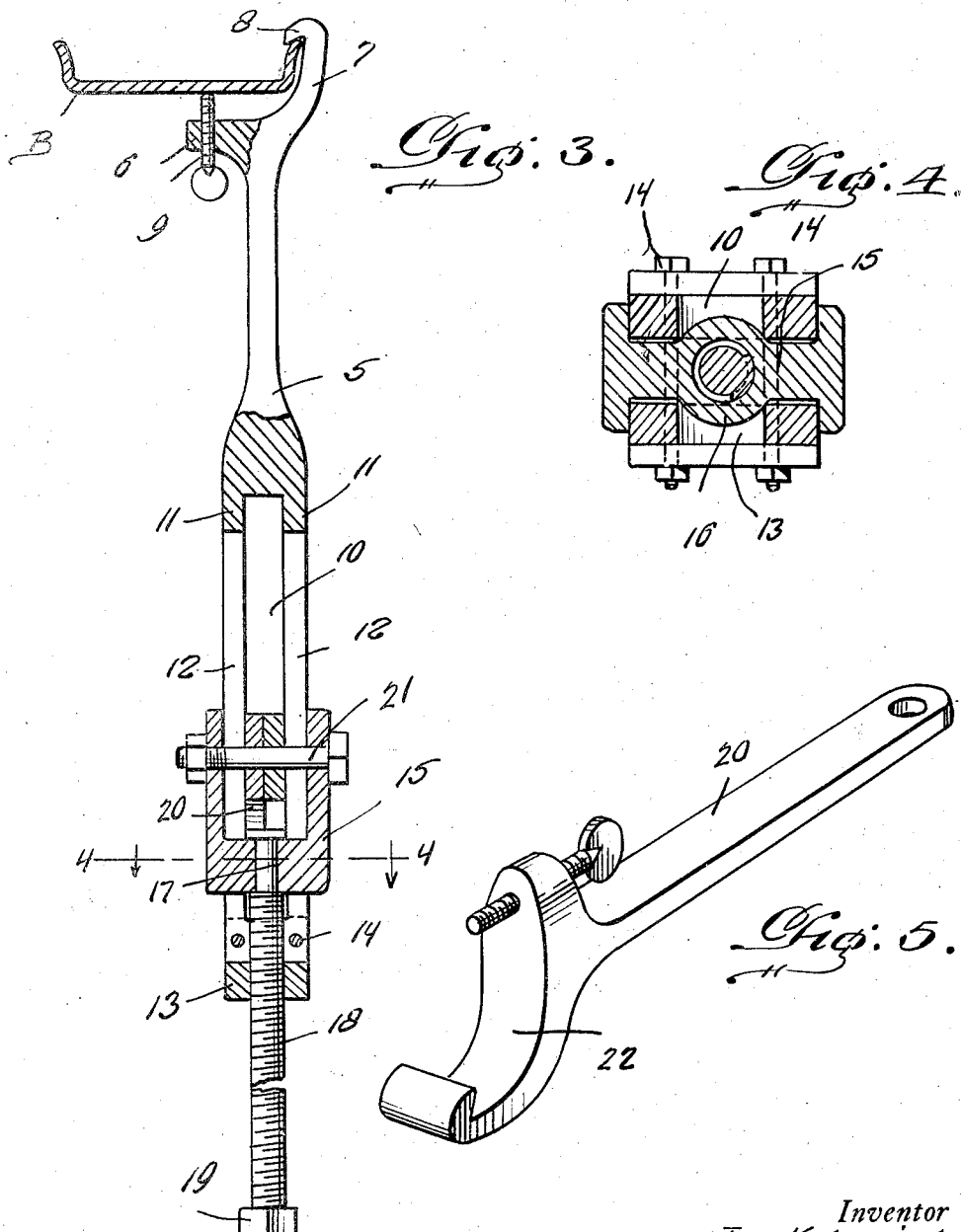

Patented Dec. 28, 1926.

1,612,130

UNITED STATES PATENT OFFICE.

JOHN KOBASICH, OF HERMANSVILLE, MICHIGAN.

TIRE-RIM EXPANDING AND CONTRACTING TOOL.

Application filed April 10, 1926. Serial No. 101,133.

This invention relates to a tool for contracting and expanding tire rims to facilitate the removal and application of tires with respect to said rims, the primary object of the invention being to substantially improve and simplify the same general form of tool shown and described in my Patent #1,522,065, January 1, 1925.

To the attainment of this end the present tool constitutes the provision of but few elements of construction and these so corelated as to permit of the rapid expansion or contraction of a tire rim and wherein the corelation of the parts is such as to reduce the liability of disarrangement to a minimum.

In the drawings wherein like reference characters indicate corresponding parts throughout the various views:

Figure 3 is a detail longitudinal section through the master rim engaging arm of the tool to which a pair of additional rim engaging arms are pivotally associated, said master rim engaging arm being equipped with means for drawing all of said arms inwardly with respect to each other for contracting the rim or for forcing the same outwardly with respect to each other for expanding the rim.

Figure 4 is a detail transverse section taken substantially upon the line 4—4 of Figure 3 and looking downwardly in the direction of the arrows, and Figure 5 is a perspective of one of the said pair of rim engaging arms.

Figure 1:
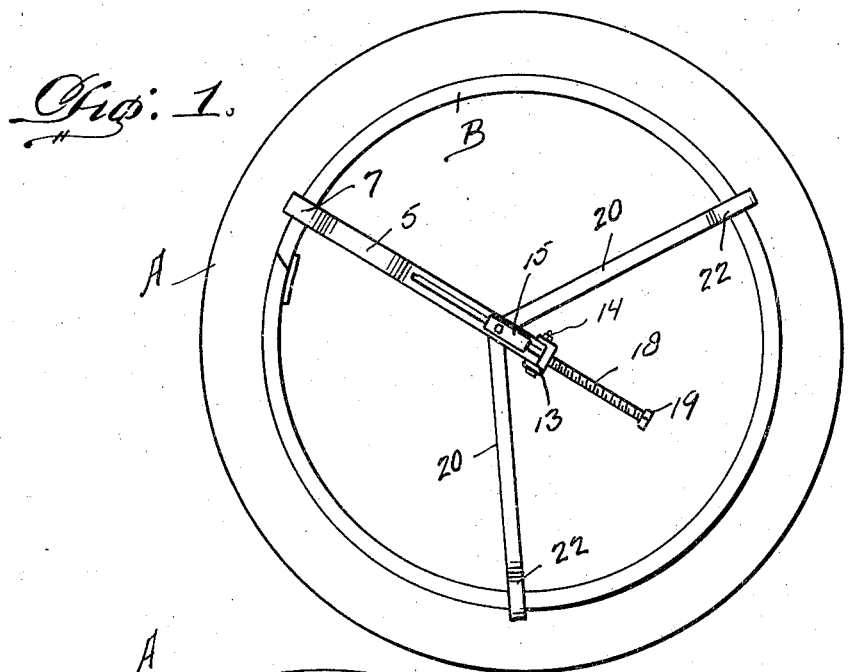
Figure 1 is a side elevation of my improved tire rim contracting and expanding tool disclosed in position upon a rim in such a manner as to facilitate the contraction of the same.
Figure 2:
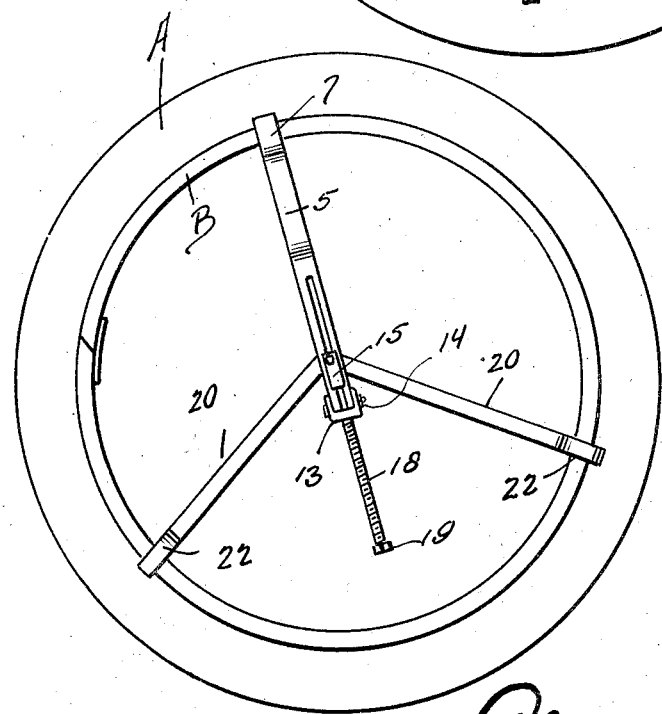
Figure 2 is a similar view disclosing the tool in position upon a rim after the same has been expanded by reason of the present tool.

Now having particular reference to the drawings, A in Figures 1 and 2 designates a conventional form of pneumatic tire that is adapted for arrangement upon the conventional form of split rim B, which rim is adapted to be expanded or contracted by reason of the tool constructed in accordance with the present invention for facilitating the application or removal of the tire with respect to said rim. The tool constitutes the provision of a master rim engaging arm 5 of predetermined length that is formed at one end with a cross head 6, one end of which extends upwardly as at 7 and is then bent over to provide a rim flange engaging lug 8, the opposite end of said head being provided with a threaded opening for receiving a headed screw 9 for forced engagement with the under side of the rim B in a manner and for a purpose hereinafter to be more fully described.

The arm 5 is formed throughout its major portion with a slot 10 that opens at the lower end of the arm for providing a pair of spaced legs 11—11, each of which is formed with a longitudinal slot 12 extending at right angles to the slot 10, and being in transverse registration with each other as clearly shown in Figures 3 and 4. Interconnecting the lower ends of the legs 11—11 is a relatively U-shaped head 13, the legs of which engage upon the outer sides of the legs 11—11 and are connected thereto by cross bolts 14.

Slidably arranged within the registering slots 12—12 of said legs 11—11 is a U-shaped head 15, the legs of said head being arranged upon the outer sides of said legs 11—11 of the arms and being relatively wider than the connecting portion of the head as shown in Figure 4 to prevent the lateral movement of the head within said slot.

The leg connecting portion of the head is formed at a point within the slot 10 of the arm 5 with a circular enlargement 15 that is formed with a central opening for receiving a swivel pin 17 upon the inner end of a threaded bolt 18 that is threaded within an opening in the rigid head 13 upon the lower end of the arm whereby said head 15 may be moved in reverse direction with respect to the arm by turning said bolt in opposite directions, the outer end of the bolt being headed as at 19 for facilitating the turning of the same by reason of a wrench or other suitable tool.

The present device constitutes further the provision of a pair of auxiliary rim engaging arms 20—20, the inner ends of which are adapted for overlapping engagement within the slot 10 of the arms and to be there pivotally interconnected by reason of a cross bolt 21 extending through registering openings in the legs of the head 15, the slots 12—12 and openings in said ends of the auxiliary arms 20—20. The outer ends of these arms 20—20 are formed with heads 22 similar in all respects to the head upon the end of the arm 5.

It will thus be seen that by applying the tool to a rim as per Figure 1, and then turning upon the bolt 18 in a direction for moving the head 15 forwardly of the arm 5, the heads of the three arms will be drawn toward the center of the rim for consequently breaking the joint and then contracting said rim for permitting of the ready disengagement of the tire with respect thereto. For contracting the rim it is necessary that the head of the arm 5 be disposed directly adjacent the split of the rim whereas when it is desired to expand the rim, the tool is arranged as disclosed in Figure 2. Prior to expanding the rim the tire A is of course arranged thereon and the heads of the arms wedged upon the rim by turning inwardly upon the screws 9 of the head. The bolt 18 is then turned in a reverse direction for drawing the head 15 outwardly of the arm consequently forcing the heads outwardly for producing the desired result.

It will thus be seen that I have provided a tool for expanding and contracting rims that is much more simple of construction and operation than the tool shown and described in the beforementioned Patent 1,522,065, granted to me on January 1, 1925, and even though I have herein shown and described this particular tool as consisting of certain detail elements of construction it is nevertheless to be understood that minor changes may be made without affecting the spirit and scope of the appended claims.

Having thus described the invention, what I claim as new and desire to secure by Letters Patent is:—

1. In a tire rim tool of the character described, a main rim engaging arm formed at one end for engagement beneath the rim and for hooked engagement with one flange thereof, said arm being longitudinally slotted at its other end for providing a pair of spaced legs, said legs being formed with longitudinal registering slots, a cross head slidable within the slots of the legs, means for moving the head in opposite direction with respect to the arm, and a pair of secondary arms pivotally connected at their inner ends within the slot of the main arm and to said head, the outer ends of the secondary arms being formed for engagement beneath the rim and with said flange.

2. In a tire rim tool of the character described, a main rim engaging arm formed at one end for engagement beneath the rim and for hooked engagement with one flange thereof, said arm being longitudinally slotted at its other end for providing a pair of spaced legs, said legs being formed with longitudinal registering slots, a cross head slidable within the slots of the legs, a pair of secondary arms pivotally connected at their inner ends in the slot of the main arm, and to said head, the outer ends of the secondary arm being formed for engagement beneath the rim and said flange, means for moving said head and the pivotal ends of the arms in opposite directions with respect to the main arm for causing the contraction or expansion of the rim, said means comprising a screw bolt threaded through an opening in the cross head at the lower ends of the arm legs and swivelly associated with said sliding head.

In testimony whereof I affix my signature.

JOHN KOBASICH.